(12) United States Patent
Stockhausen et al.

(10) Patent No.: US 8,155,407 B2
(45) Date of Patent: Apr. 10, 2012

(54) METHOD AND DEVICE FOR NAVIGATING AND MEASURING IN A MULTIDIMENSIONAL IMAGE DATA SET

(75) Inventors: Jens Stockhausen, Eching (DE); Marcus Schreckenberg, Freising (DE); Rolf Baumann, Wangen (DE); Martin Hyca, Munich (DE); Christian Galuschky, Munich (DE); Georg Schummers, Munich (DE)

(73) Assignee: TomTec Imaging Systems GmbH (DE)

( * ) Notice: Subject to any disclaimer, the term of this patent is extended or adjusted under 35 U.S.C. 154(b) by 1005 days.

(21) Appl. No.: 12/064,710

(22) PCT Filed: Jul. 18, 2006

(86) PCT No.: PCT/EP2006/007061
§ 371 (c)(1),
(2), (4) Date: May 8, 2008

(87) PCT Pub. No.: WO2007/025608
PCT Pub. Date: Mar. 8, 2007

(65) Prior Publication Data
US 2008/0240534 A1    Oct. 2, 2008

(30) Foreign Application Priority Data

Sep. 1, 2005  (DE) .................. 10 2005 041 581

(51) Int. Cl.
*G06K 9/00* (2006.01)
(52) U.S. Cl. ...................... 382/128; 600/437
(58) Field of Classification Search .................. None
See application file for complete search history.

(56) References Cited

U.S. PATENT DOCUMENTS

| 2003/0152262 A1* | 8/2003 | Mao et al. ............. 382/154 |
| 2006/0036173 A1* | 2/2006 | Kelly et al. ............ 600/443 |
| 2006/0100512 A1* | 5/2006 | Lee ..................... 600/437 |

* cited by examiner

*Primary Examiner* — Hoon Song
(74) *Attorney, Agent, or Firm* — Cantor Colburn LLP

(57) ABSTRACT

The invention relates to a method and device for navigating on a vision plane (1) in a multidimensional image data set (8), wherein the intersection angle and degree of freedom (3, 6, 7) of the vision plane (1) displacement correspond to the degree of freedom of a sample (2) displacement, in particular an ultrasound transducer (2) during an interactive image producing examination. Said invention also relates to a method and device for carrying out measurements in dynamic image data, wherein said method consists in stopping, for a predefined time interval, a sequence reproduction when a frame (Fp) is interesting, thereby enabling a user to carry out measurements.

18 Claims, 5 Drawing Sheets

METHOD AND DEVICE FOR NAVIGATING AND MEASURING IN A MULTIDIMENSIONAL IMAGE DATA SET

TECHNICAL FIELD OF THE INVENTION

The invention relates to a method and device for navigation and measurement in a multidimensional image data set of an object which has been obtained/acquired in particular by a medical imaging method.

BRIEF DISCUSSION OF RELATED ART

In many medical technology imaging methods, such as ultrasound, magnetic resonance tomography or optical coherence tomography (OCT), it is possible to obtain three-dimensional (3D) or four-dimensional (4D) image data sets of the object to be examined. A four-dimensional data set is a time sequence of plural three-dimensional images. However, orientation in such a 3D or 4D image data set of an organ is relatively difficult and requires considerable experience on the part of the user, generally of the cardiologist/radiologist or consultant.

To examine and carry out measurements in the image data, these are mostly observed on two-dimensional section images. In order to navigate the section planes through the image data set, in known methods the user can move the section plane in all 6 directions of space through the three-dimensional image data set. Often in this case 3 section images which are perpendicular to one another can be represented, which the user can then slide and rotate. In this type of navigation, the user must get used to and train navigating in the 3D/4D image data.

It is also known to represent a structure of interest by "surface rendering" or "volume rendering". In this case, a 2D view of the object having shaded surfaces is generated from the 3D data volume. The structure of interest is however often covered by other structures of the object, which then have to be cut away by means of what are known as "scalpel" tools. A corresponding method for this is disclosed in DE 103 39 979 A1. In this case, on a section image, a vector is set up, which spans the structure of interest. A plane is set up through the starting point and/or the end point of the vector, which is at right-angles to the vector, and the image data on the other side of the planes are blanked out, so that only those image data are represented which lie between the planes. This method has the disadvantage that, due to the geometry of the planes, in each case only a slice-like area can be cut clear, which often does not correspond to the shape of the structure of interest.

In examining dynamic image data, further problems arise if the user wants to carry out a measurement, e.g. measure a certain distance in the structure, or to set markers at specified anatomical landmarks. In the prior art, this is only possible on a static image, so that the dynamics of the structure are not taken into account during measurement. In ultrasound examinations of the heart, for example, the examining doctor is used to seeing the heart in motion. Many diseases of the heart can be recognised only upon observing the beating heart. Therefore, precise and anatomically correct measurement is often only possible if the dynamics of the structure are being observed.

BRIEF SUMMARY OF THE INVENTION

The invention makes available options for navigating and carrying out measurements in multidimensional, in particular 3D and 4D, image data sets which do not have the above-mentioned disadvantages.

This is achieved in the invention according to a first aspect with a method which comprises a step for navigation in a multidimensional image data set, in which the user moves a plane of view through the image data set by means of an input device, during which a section image corresponding to this plane of view is represented. The method is characterised in that in that the plane of view intersects the image data set at an angle which corresponds to an angle of view contained during an interactive imaging examination, and in that the degrees of freedom of the movement of the planes of view corresponds to the degrees of freedom of the movement of a "probe" or of an acquisition device during an interactive imaging examination. In the navigation according to the invention, therefore, the accustomed movements and ways of viewing of the user are simulated. The degrees of freedom of movement are consciously limited to the degrees of freedom which are available during the interactive imaging examination e.g. during an ultrasound examination. Thus navigation by the doctor is intuitive and can be quickly learnt. Furthermore, the doctor only sees section images which correspond to the usual perspectives and section images, so that there is no risk that he will lose his orientation in a 3D or 4D image data set.

Particularly preferably, the plane of view corresponds to the sound field of an ultrasound transducer, which may have e.g. a two-dimensional fan-shape. Accordingly, the movement of the plane of view corresponds preferably to the movement of the ultrasound transducer, i.e. the plane of view can be pivoted, rotated or slidably displaced on a virtual recording surface. The degrees of freedom of movement are preferably controlled via a single input device such as e.g. a computer mouse, the pivoting motion, rotation and sliding being controlled e.g. by the left-hand or right-hand mouse button, or by a scrolling wheel on the mouse. Thus the eye can be kept on the image data throughout the navigation.

If the image data set represents a moving heart, for example, the user usually searches first of all the 4-chamber view with the plane of view. What is known as the 2-chamber view and the longitudinal axis section are respectively rotated through approx. 60° relative to the 4-chamber view. Thus, according to a preferred embodiment of the invention, respectively 1 or 2 further section images are shown, which are rotated through a fixed angle relative to the plane of view.

Preferably, the method comprises a further step in the method of cutting the structure of interest clear, in which case a vector is set up on a section image and spans the structure of interest. A straight or curved plane or a free-form surface is set up through the image data set through the end point and/or the starting point of the vector, the plane extending perpendicularly on the vector. In this case, the image data on one side of the plane are blanked out, so that e.g. the structure lying between the planes is cut clear. Unlike the prior art, for the plane, a free-form or curved surface, in particular a spherical surface with variable radius, can be used, so that it can be adapted to the structure of interest.

According to a further aspect, the invention relates to a method which comprises a step of carrying out measurements and/or setting landmarks in a multidimensional dynamic image data set of the object, which contains a sequence composed of consecutively acquired 2D or 3D frames. The method is characterised in that a frame of interest is chosen, in which the measurement is to take place, and accordingly the sequence is played through by consecutive display of the individual frames, this display stopping at the frame of interest for a predetermined time, during which the user can set a marker or take a measurement. Thus the user can observe the object dynamically, but at the same time obtains for a time span of e.g. 1 to 2 seconds the option of studying a certain frame more closely and of setting a measuring point or landmark or measuring out a distance e.g. with the mouse.

Particularly preferably, the display loop is repeated more than once, in which case the display stops at the frame of interest for a predetermined time span in each case. According to another embodiment, the display loop is likewise run through more than once, but the display stops in each display loop on a different frame. This type of display can be repeated for various planes of view of a 4D data set.

From various measurements in various planes of section and/or at various points in time or time intervals, optionally measurements can be linked both in place and/or time. From these links, preferably further measurements are derived, such as for example, the change in a measurement over time and/or in space. This may involve for example areas, angles, volumes and their change over time, thus for example the change in volume of the heart during beating over time or the change in diameter of the mitral valve ring over time.

To represent such measurement results, according to a preferred embodiment, a two-dimensional rendering of the structure of interest is generated by surface rendering or volume rendering. In this rendering, at least one voxel is highlighted in colour according to the measuring results or the derived measurement results.

The invention relates also to a device which is suitable for carrying out the method according to the first and second aspect.

Finally, the invention also relates to a computer program product which contains software code stored on a computer-readable medium and which enables a computer to carry out the method described above when the computer program product is installed on the computer.

BRIEF DESCRIPTION OF THE DRAWINGS

The invention is explained more fully with the aid of an embodiment with reference to the attached drawings, which show:

FIG. 5 a rendering generated by volume rendering of a heart with areas of interest coloured in;

DETAILED DESCRIPTION OF THE INVENTION

Figure 1:
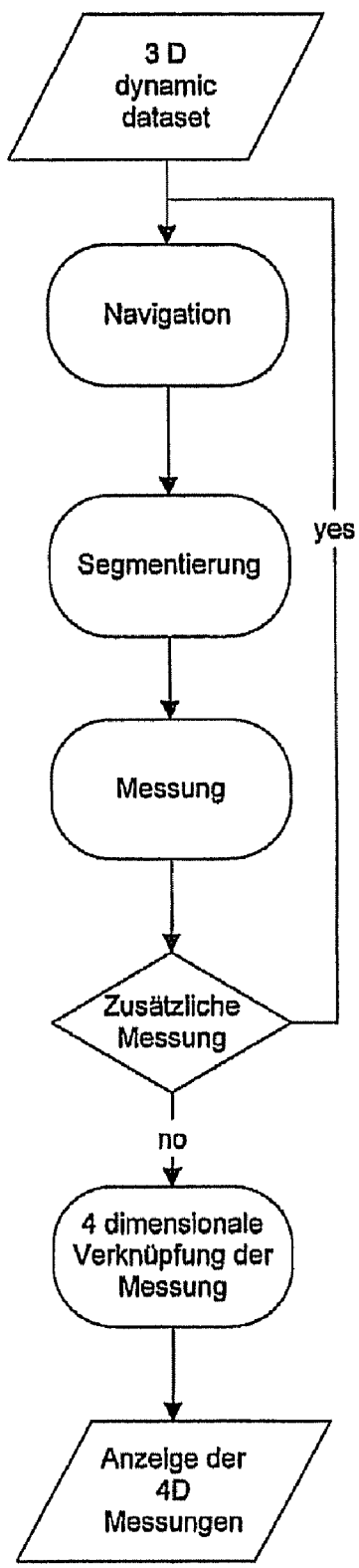
FIG. 1 a flow diagram showing the sequence of the method of examination according to one embodiment of the invention.

FIG. 1 gives an overview of an example of a complete examination method of a three-dimensional dynamic (i.e. four-dimensional) image data set 8. At least the steps 14, 18 and 20 are in this case optional.

According to step 12, the user navigates through the image data set in order to find a section image on which the structure of interest is shown advantageously. Optionally, he can segment the image data set in a step 14, i.e. cut clear the structure of interest. In step 16, the actual measurement is then carried out, and e.g. a landmark is set or a distance or an area on a section image is measured. These 3 steps are if necessary repeated in order to carry out further measurements. In step 18, the measurement results are then linked in place and/or in time and are displayed in step 20. In this case, there is an option of highlighting the measurement results in colour in the image data set.

Figure 2:
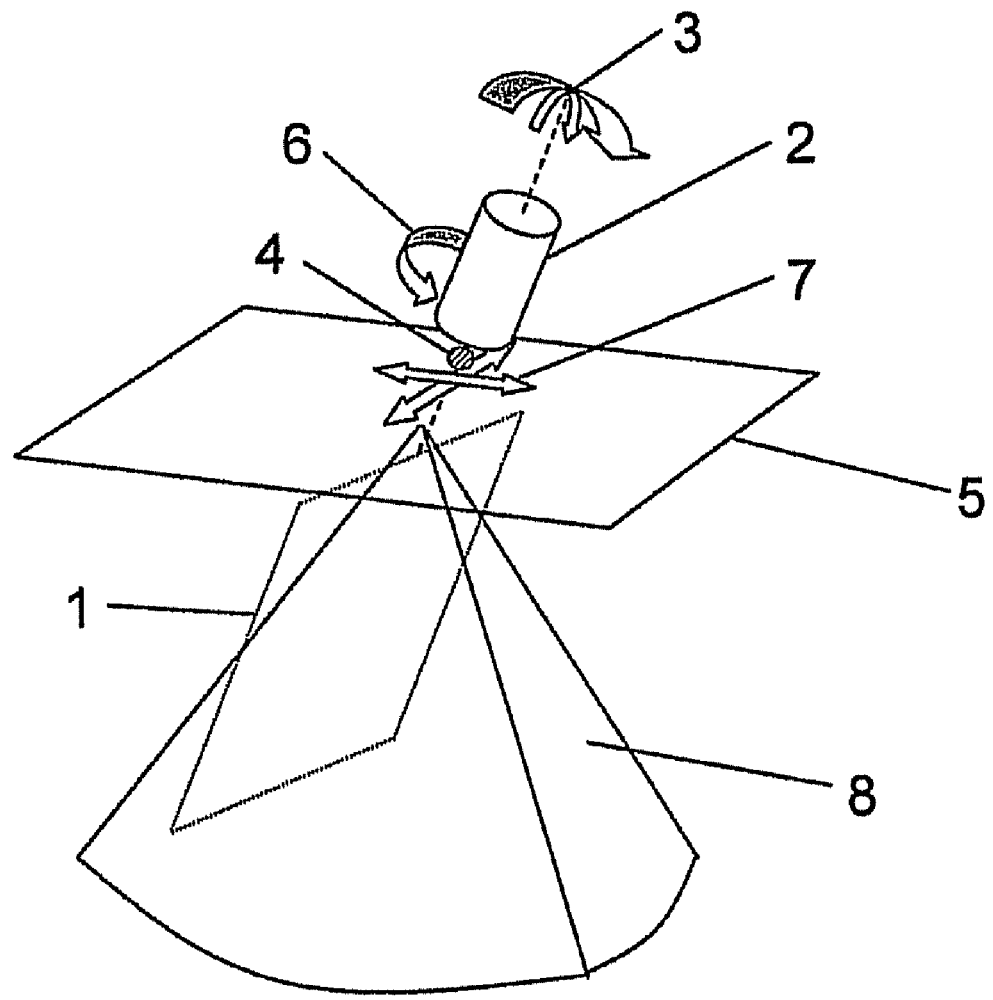
FIG. 2 a schematic representation of the degrees of freedom in moving a plane of view through an image data set.

The step 12 in the method of navigation will now be described more fully with the aid of FIGS. 2 and 6. FIG. 2 shows a three-dimensional image volume 8, which has been obtained/acquired by a three-dimensional ultrasound measurement. In this case, an ultrasound transducer has been pivoted on the surface of the patient's body in order thus to obtain image data from a conical data volume. Navigation of the plane of view through this image volume is then simulated by movement of the ultrasound head. The figure therefore shows a virtual probe 2, which is firmly connected to a virtual sound plane 1, the plane of view. In this case, further planes of view can also be navigated simultaneously, e.g. in capturing the heart, two longitudinal axis section and one short axis section. Pivoting of the virtual probe 2 according to the reference 3 in FIG. 2 takes place about a base point 4. This pivoting motion may be limited to e.g. ±80° in order thus to simulate the limitations in movement of an interactive examination.

Figure 6:
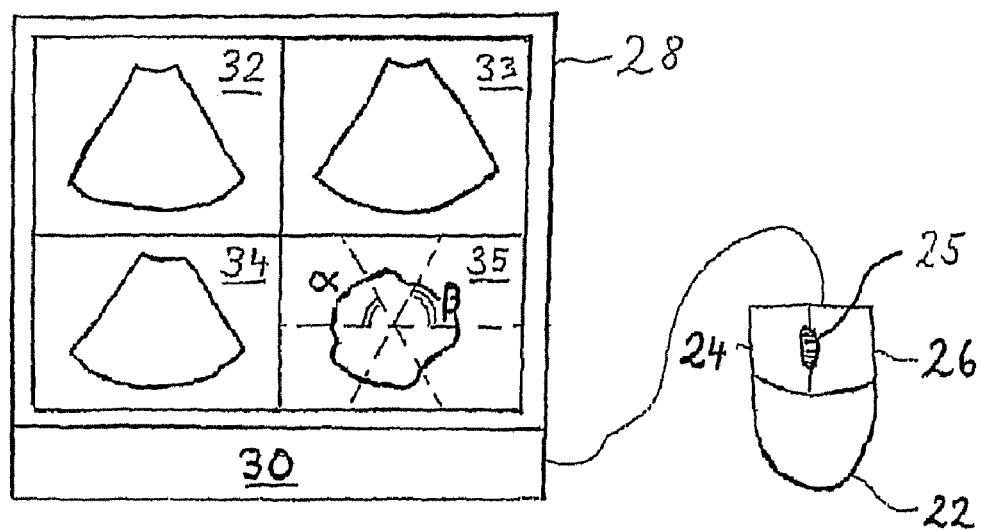
FIG. 6 a schematic representation of a device according to one embodiment of the invention.

With reference to FIG. 6, a section image 32 corresponding to the plane of view 1 is shown on a screen 28. The screen is connected to a computer 30, to which in turn the input device e.g. in the form of a computer mouse 22 is connected. The mouse has a left-hand mouse button 24, a right-hand mouse button 26 and a scrolling wheel 25. In addition to the section image 32 corresponding to the plane of view 1, in the example shown on the screen 28, two further section images 33, 34 are shown, which correspond to the same angle of incidence of the virtual probe 2, but are rotated through the angle α or β relative to the plane of view 1. This is shown on a further window 35 which shows a cross-section through the image data set 8, on which the position of the section images 32, 33, 34 are shown as broken lines. This type of division of the screen 28 is however only one preferred example.

Returning to FIG. 2, the base point 4 of the virtual probe 2 can only be moved along a virtual recording surface 5. The virtual recording surface is a simulation of the surface on which the probe or acquisition device rests during an interactive measurement and on which it can be moved. In ultrasound images, this is often the skin surface of the patient, but may also be a surface inside the body such as e.g. the windpipe if the ultrasound transducer is inserted through the same, or a bone surface or a surface outside the body determined by the type of image to be taken. The virtual recording surface 5 may be either planar or have a certain curvature, which for example simulates the object being scanned.

Rotation about the longitudinal axis of the probe 2 takes place according to the arrow 6, e.g. with the scrolling wheel of the mouse and is advantageously limited to e.g. ±90°. Translation along the virtual plane of the skin 5 according to the direction of the arrow 7 is effected e.g. with the right-hand mouse button.

The virtual plane 5 of the skin can also be realised as a spherical surface, in which case the sphere preferably barely encloses the image volume 8. Thus, in principle, any section planes are possible, which may however impede orientation in the data volume.

Figure 3:
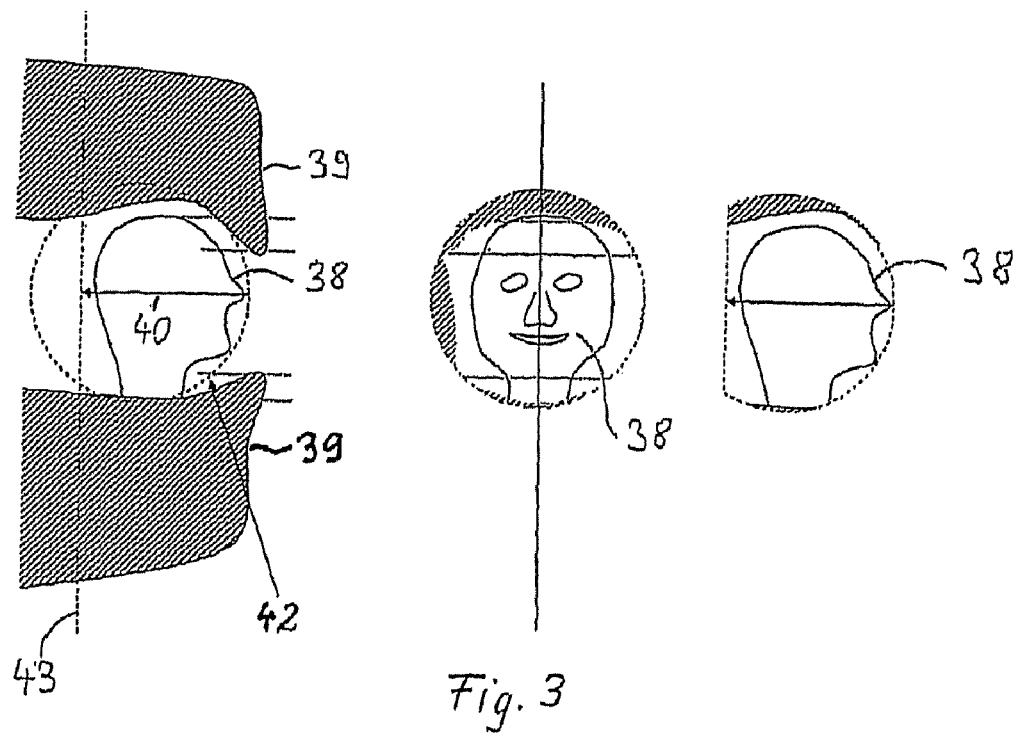
FIG. 3 schematic representations of a section image with a structure of interest, which has been cut clear by an optional step in the method.

FIG. 3 shows the optional step 16 in the method in which the structure 38 of interest, in this case e.g. the head of a foetus, is cut clear. The left-hand diagram shows a section image through the image data set, the head 38 being covered by the structures 39 shown shaded, e.g. the womb. In order to cut these structures away, the user fixes a vector shown as an arrow 40 on the section image. A plane 43 extends through the starting point of the vector, and a spherical surface 42 through the end point. As can be seen in the right-hand diagram, all the image data lying outside the two surfaces 43, 42 are cut away. With the spherical shape of the surface 42, the segmented volume of interest contains almost exclusively the head 38. If then according to the middle diagram a surface view of the head is generated by volume rendering, the face is no longer hidden by the wall of the womb 39.

If the user has thus found the image areas in which he wishes to carry out a measurement and has cut them clear, these are shown dynamically. The step 10 for carrying out measurement in a dynamic image data set will now be explained more fully with the aid of FIG. 4. In this, first of all a frame of interest Fp is defined or computed from the time sequence of 2D or 3D images (frames). Then the dynamic sequence of images is displayed with a normal playback speed. In the case of an image of the heart, e.g. 20 to 30 frames are played back which have been acquired during one heartbeat. A normal playback speed is in this case 20 frames per second.

Figure 4:
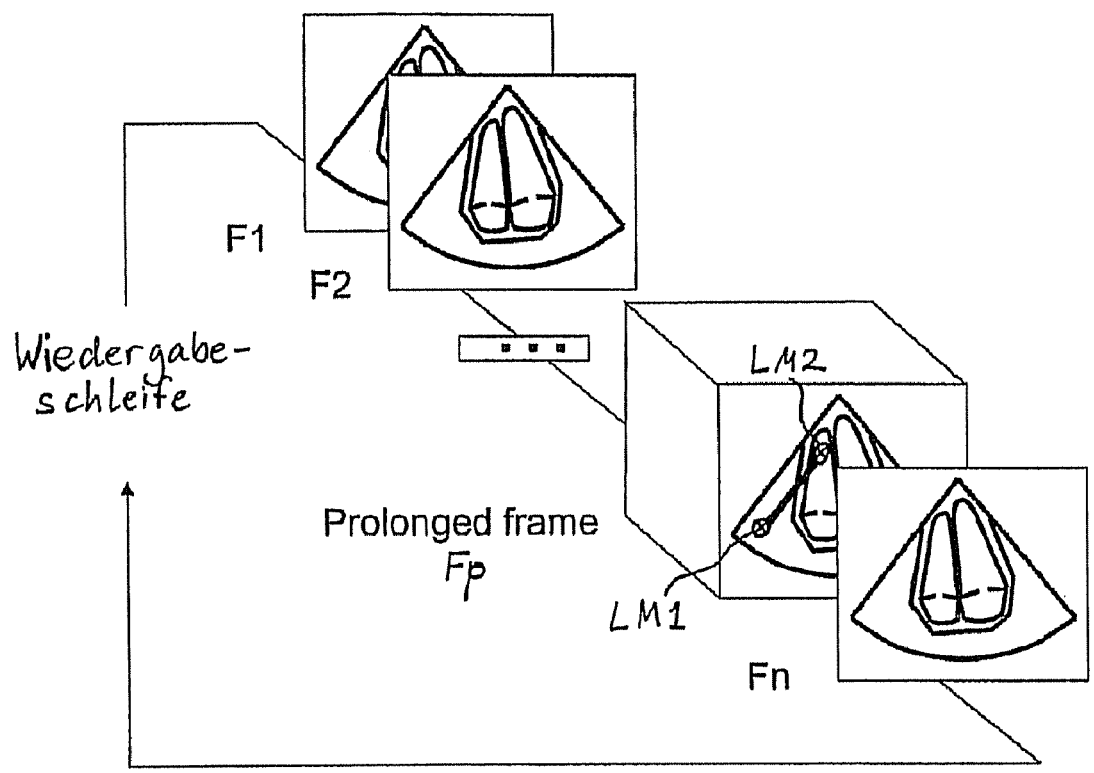
FIG. 4 a schematic representation of the dynamic display and measurement according to the second aspect of the method according to the invention.

If the frame of interest Fp is reached, the display stops for a predetermined time span. FIG. 4 shows this frame referenced "prolonged frame Fp". During this time, the user can then set the markers LM1 and LM2 and e.g. measure the distance between these landmarks so set in the image Fp which is displayed longer. The time span during which the display is halted can either be a predefined time of e.g. 0.5 to 5 seconds and particularly preferably 1 to 2 seconds, or according to another embodiment, the time span may last as long as the measurement takes. After the predetermined time duration and/or after the measurement has been completed, the display loop plays on. Thus the user has available both the dynamic impression of the sequence and also a static image from the sequence in order to be able to draw in the measurement exactly. This process can be repeated more than once in various image planes. After setting of the points, this method can also be applied for adjustment of the points set.

According to a further embodiment, the display loop is run through more than once, and the display stops each time at a different frame, e.g. at F1, F2, . . . Fn. Thus for example the same structure can be measured in each phase of movement.

Figure 5:
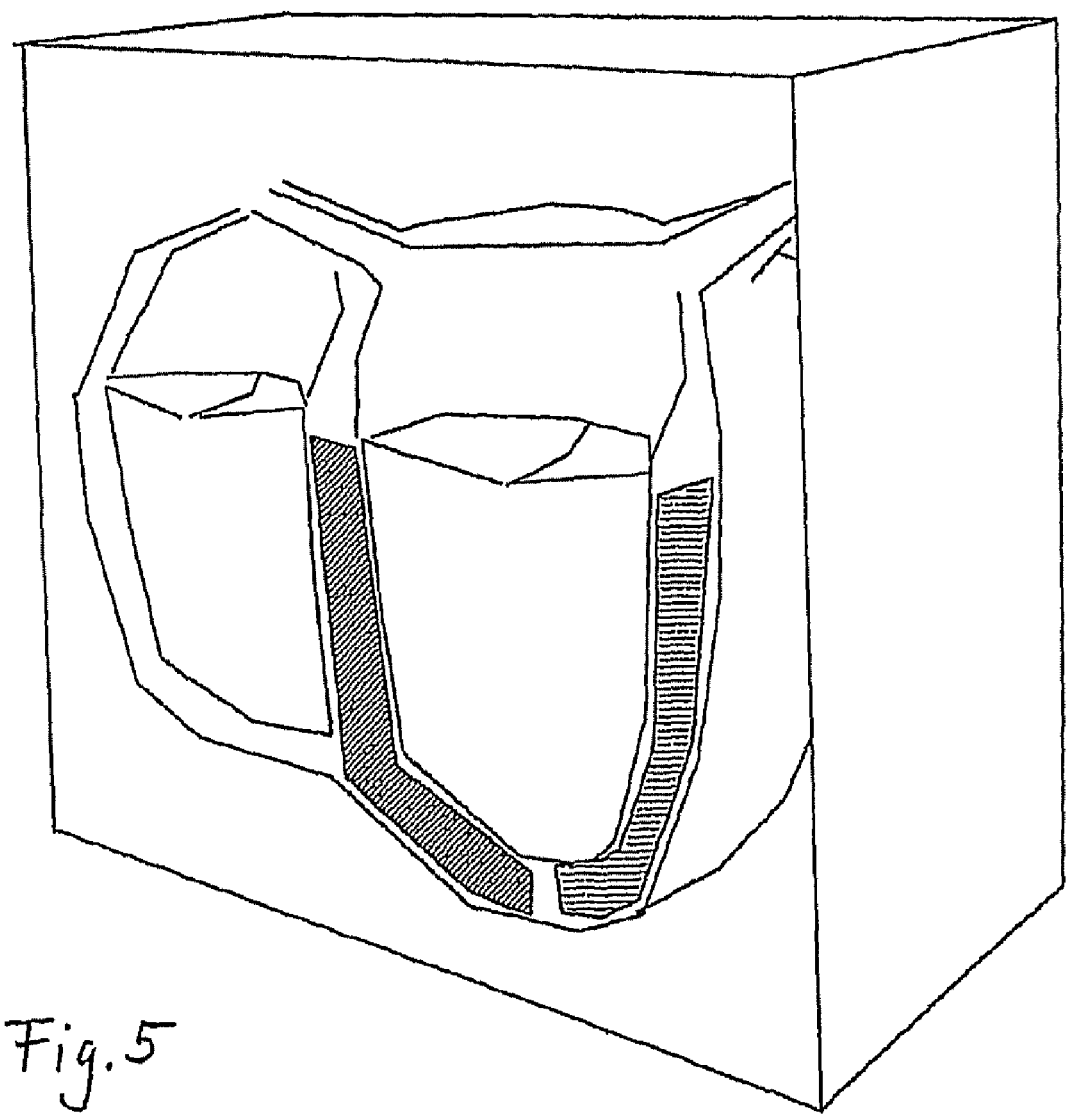

From the measurements thus taken in various section planes and/or at various moments in time, measurements can be linked both in place and in time. From these links, further readings can be derived, such as for example the change in a measurement over time (step 18). In an optional step 20, these measuring results are e.g. highlighted in colour in a two-dimensional view obtained by surface rendering. FIG. 5 shows e.g. such a view of a heart, in which a shaded area 45 has been coloured e.g. red and a dotted region 46 e.g. in turquoise. The colour coding corresponds e.g. the moment of the contraction of the correspondingly coloured heart chamber wall.

FIG. 6 shows an embodiment of the device according to the invention schematically. This comprises a screen 28, an input device 22 and a computing unit 30, which may be a computer for example. The invention can also be incorporated in a computer program product, which contains software code sections which are installed on the computer 30 so that this carries out the re-written method.

The invention therefore makes available a method of simple navigation in multidimensional image data, an optional step for segmenting structures, a method of carrying out measurements on dynamic data, and a step for linking four-dimensional measurements and a step 20 for representing the dynamic measurement results in the four-dimensional data set.

The invention claimed is:

1. Method of navigation and measurement in a multidimensional image data set of an object, which has been obtained in particular by a medical imaging method, comprising:
   navigating in the multidimensional image data set, where the user moves a plane of view through the image data set by an input device and meanwhile a section image corresponding to this plane of view is represented,
   wherein the plane of view intersects the image data set at an angle corresponding to an angle of view obtained during an interactive imaging examination,
   wherein degrees of freedom of movement of the plane of view correspond to degrees of freedom of movement of a probe during an interactive imaging examination, and
   wherein in addition to the section image corresponding to the current plane of view, one or two section images are represented which are rotated through a fixed angle relative to the plane of view.

2. Method according to claim 1, wherein the plane of view corresponds to a sound field of an ultrasound transducer.

3. Method according to claim 1, wherein the movement of the plane of view corresponds to movement of an ultrasound transducer during an interactive ultrasound examination, wherein by actuating the input device pivoting, rotation and sliding of the plane of view on a virtual recording surface (5) is possible.

4. Method according to claim 3, wherein the input device is a computer mouse and in the pivoting movement, the rotary movement and the sliding are respectively controlled by a left-hand or right-hand mouse button or by a scrolling wheel of the mouse.

5. Method according to claim 3, wherein the virtual recording surface is a plane or a spherical surface.

6. Method according to claim 1, further comprising cutting clear a structure of interest in the object, wherein:
   on a section image a vector is set up which spans the structure of interest,
   through an end point and/or a starting point of the vector, a straight or curved plane or a free-form surface extending perpendicular to the vector is set up through the image data set,
   and image data lying on one side of the plane are blanked out.

7. Method according to claim 1, further including the steps of:
   carrying out measurements and/or setting landmarks in the multidimensional dynamic image data set of the object, which contains a sequence of plural consecutively captured two-dimensional or three-dimensional frames;
   selecting a frame of interest, in which the measurement is to take place; and
   playing back of the sequence by consecutive display of individual frames, wherein the display stops at the frame of interest (Fp) for a predetermined time span, during which a user can set a marker or carry out a measurement.

8. Method according to claim 7, wherein the sequence is played back more than once, wherein in each display loop the display stops at the frame of interest for a predetermined time span.

9. Method according to claim 7, wherein the sequence is played back more than once, wherein in each display loop the display stops at a different frame for a predetermined time span.

10. Method according to claim 7, wherein the playback of the sequence is repeated for different planes of view in a four-dimensional data set.

11. Method according to claim 7, wherein further readings are derived from the measurement results.

12. Method according to claim 7, wherein a two-dimensional rendering of a structure of interest is generated by surface or volume rendering, wherein in the two-dimensional rendering at least one voxel corresponding to the measurement results obtained or the derived measurement results is highlighted in color.

13. Device for navigation and measurement in a multidimensional image data set of an object, which has been obtained in particular by a medical imaging method, comprising:
- an input device with which a user can move through the image data set in order to navigate a plane of view;
- a computing means for generating a section image through the image data set corresponding to the plane of view; and
- a screen for representing the section image;
- wherein the plane of view intersects the image data set at an angle which corresponds to an angle of view obtained during an interactive imaging examination;
- wherein degrees of freedom of movement of the plane of view correspond to degrees of freedom of movement of a probe during an interactive imaging examination;
- wherein the screen is suitable for representing both the section image corresponding to the current plane of view and for representing one or two section images which have been rotated about a fixed angle relative to the plane of view.

14. Device according to claim 13, wherein the movement of the plane of view corresponds to movement of an ultrasound transducer during an interactive ultrasound examination, wherein by actuating the input device pivoting, rotation and sliding of the plane of view on a virtual recording surface is possible.

15. Device according to claim 14, wherein the input device is a computer mouse and the pivoting movement, the rotary movement and the sliding are controllable respectively by the left-hand or right-hand mouse button or by a scrolling wheel of the mouse.

16. Device according to claim 13, wherein:
- on a section image a vector may be set up, which spans a structure of interest;
- through an end point and/or starting point of the vector, a straight or curved plane or a free-form surface extending perpendicular to the vector may be set up through the image data set; and
- image data lying on one side of the plane for cutting clear the structure of interest in the object may be blanked out.

17. Device according to claim 13, wherein the image data set contains a sequence of plural consecutively captured two-dimensional or three-dimensional frames (F1, F2 ... Fn), and wherein:
- the user can set a marker or carry out a measurement in a frame with said input device; and
- said screen is configured for playing back the sequence by consecutive display of the individual frames;
- wherein a frame of interest, in which the measurement is to take place, may be selected and the display of the sequence stops at the frame of interest for a predetermined time span, during which the user can set a marker or carry out a measurement.

18. Computer program product, which contains software code stored on a non-transitory computer-readable medium, which enables a computer to carry out a method according to claim 1 if the computer program product is installed on the computer.

* * * * *